United States Patent Office 3,386,752
Patented June 4, 1968

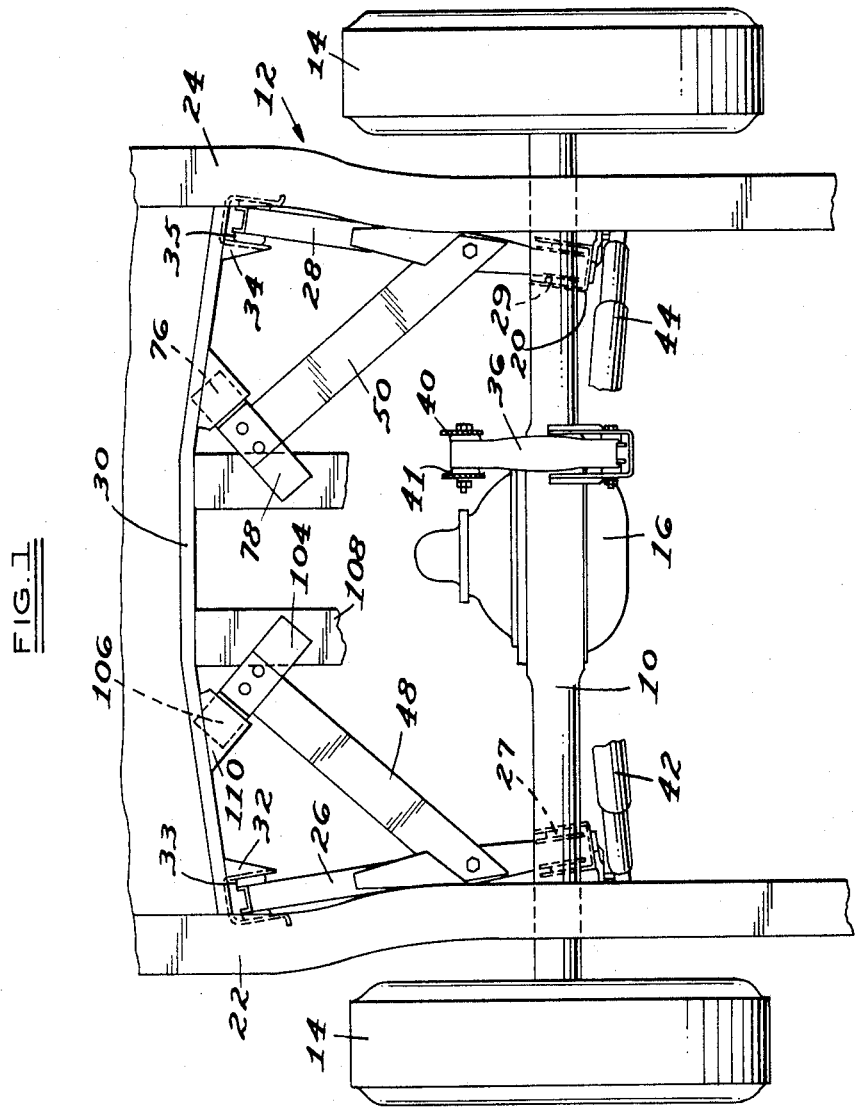

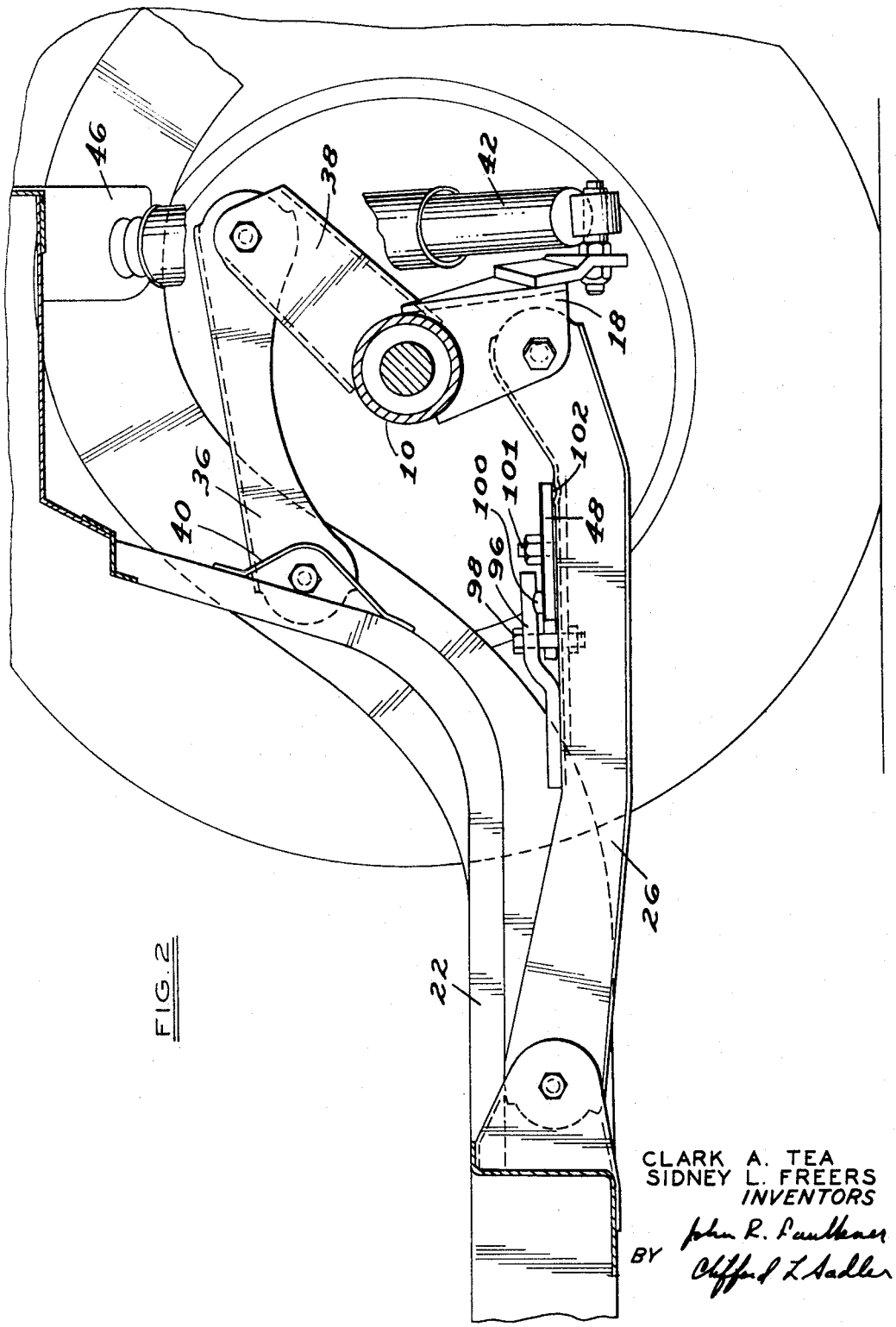

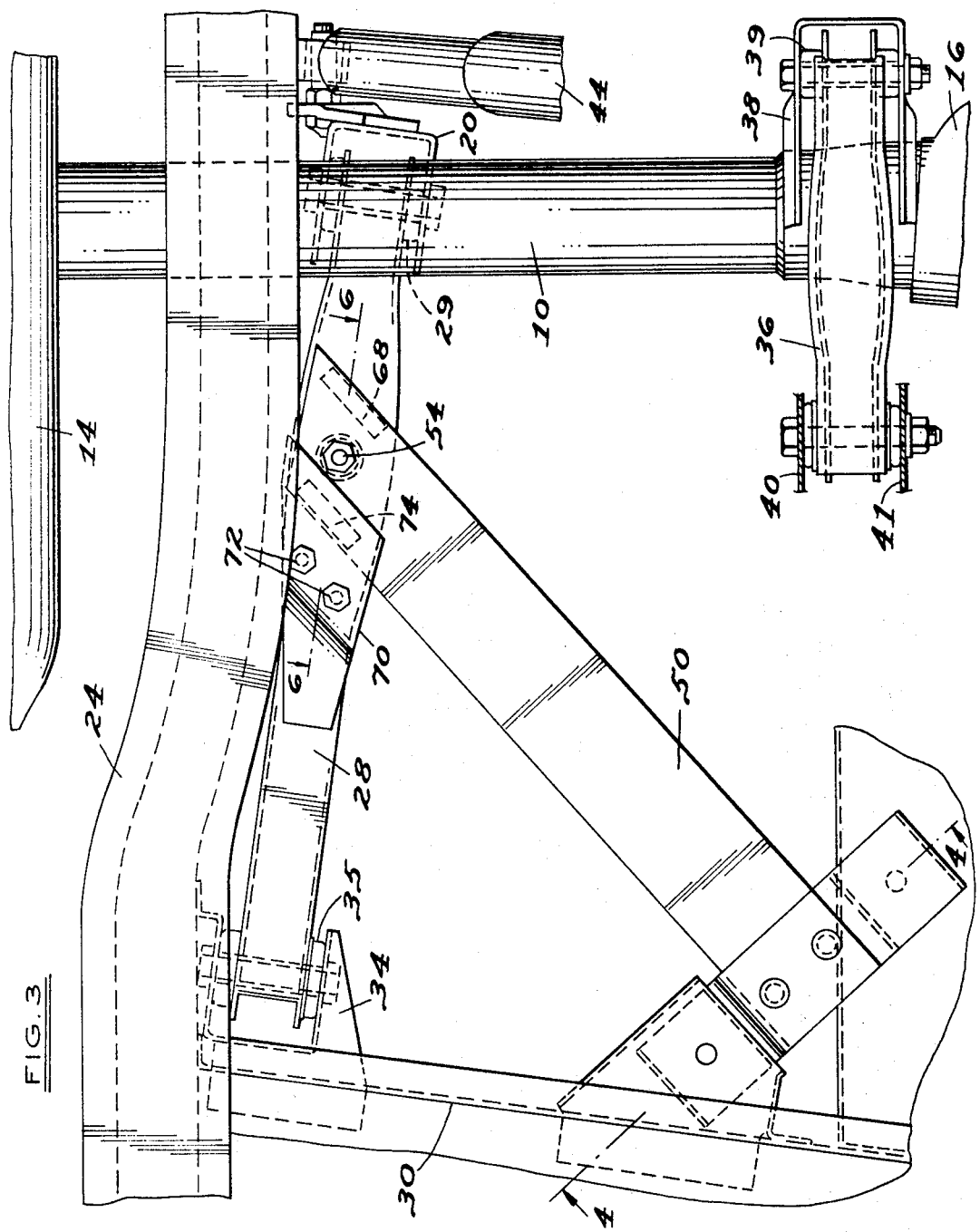

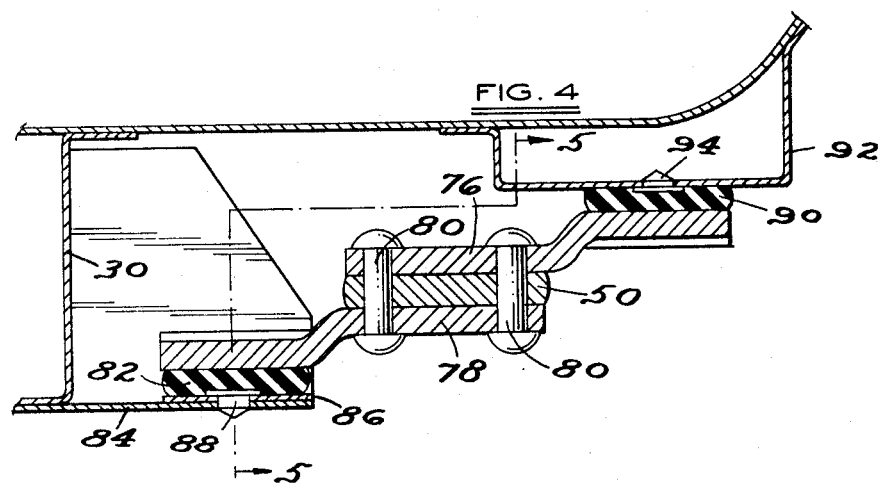
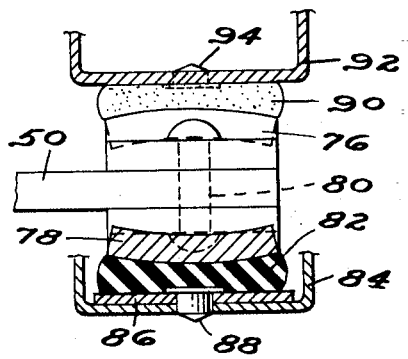
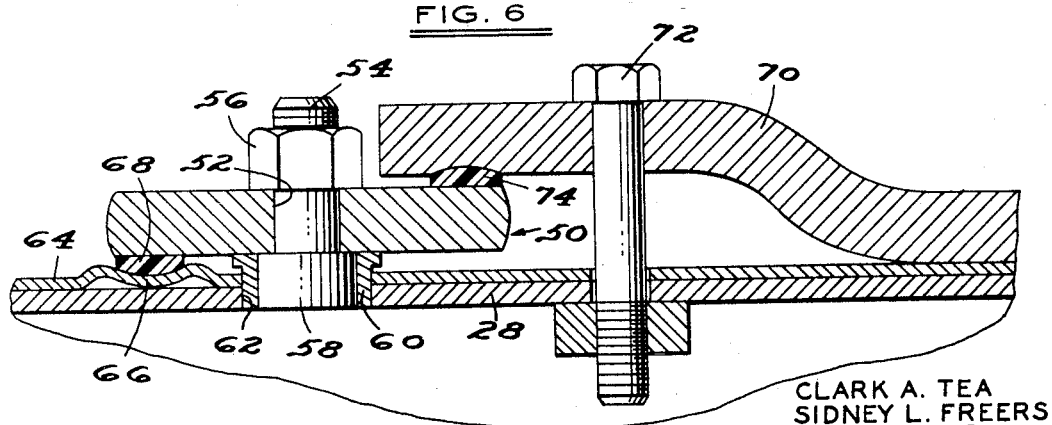

3,386,752
VEHICLE SUSPENSION SYSTEM HAVING TORSION SPRING
Sidney L. Freers, Dearborn Heights, and Clark A. Tea, Southfield, Mich., assignors to Ford Motor Company, Dearborn, Mich., a corporation of Delaware
Filed Dec. 20, 1965, Ser. No. 514,821
11 Claims. (Cl. 280—124)

ABSTRACT OF THE DISCLOSURE

A suspension system for a motor vehicle having a leaf spring interposed between sprung and unsprung components and constructed to support the vehicle load in torsion.

---

The present invention relates generally to motor vehicle suspension systems, and more particularly to a suspension system employing a torsion spring.

It is the principal object of the present invention to provide a suspension system for a motor vehicle employing a torsion spring and which is characterized by its simplicity of construction and economy of manufacture.

In one preferred embodiment of the present invention, a torsion spring suspension is provided for the rear driving wheels of a vehicle in which the torsion springs are formed from flat leaf spring stock and are connected between the vehicle chassis and the suspension components by end mountings permitting pivotal movement.

The many objects and advantages of the present invention will become apparent upon consideration of the following discussion and the accompanying drawings, in which:

FIGURE 1 is a top plan view of a rear suspension system for a motor vehicle incorporating an embodiment of the present invention;

FIGURE 2 is a side elevational view of the suspension of FIGURE 1;

FIGURE 3 is an enlarged plan view of a portion of the suspension of FIGURE 1;

FIGURE 4 is a sectional view taken along section lines 4—4 of FIGURE 3;

FIGURE 5 is a sectional view taken along section lines 5—5 of FIGURE 4; and

FIGURE 6 is a sectional view taken along section lines 6—6 of FIGURE 3.

Referring now to the drawings for a better understanding of the present invention, FIGURE 1 illustrates a rear suspension system for a motor vehicle having a rigid axle housing 10 that extends laterally of the vehicle frame 12 and rotatably supports a pair of road wheels 14 at its outer ends. A differential gear housing 16 is centrally situated in axle housing 10 and contains gearing for transmitting power from a longitudinal extending drive shaft to the driving wheels 14.

The axle housing 10 is positioned with respect to the chassis frame 12 by three suspension arms. Depending left and right brackets 18 and 20 are welded to the axle housing 10. The chassis 12 includes frame side rails 22 and 24 that have kick-up portions which pass over the axle housing 10. The brackets 18 are spaced laterally inwardly a short distance from the frame kick-ups. Left and right suspension arms 26 and 28 have their rearmost ends pivotally connected to the brackets 18 and 20 by means of resilient bushings 27 and 29.

A structural member 30 extends transversely of the vehicle and interconnects the side rails 22 and 24. Frame brackets 32 and 34 are secured to the chassis 12 near the intersection between this support structure 30 and the side rails 22, 24. The forward end of the suspension arms 26 and 28 are connected to the brackets 32 and 34 by resilient bushings 33 and 35. It will be noted in FIGURE 1 that the brackets 32 and 34 are spaced apart a greater distance than the axle housing brackets 18 and 20 so that the arms 26 and 28 diverge in a forwardly and outwardly direction.

An upper suspension arm 36 is pivotally connected to an axial housing bracket 38 by resilient bushing 39. Bracket 38 is secured to the axle housing 10 at a point offset from the center of the differential 16 and extends in an upwardly and rearwardly direction. The arm 36 is disposed to the right of the differential housing 16 in order to compensate for engine torque. The forward end of the upper arm 36 is pivotally connected to a frame bracket 40 by resilient bushing 41.

A pair of telescopic shock absorbers 42 and 44 have their lower ends connected to portions of the axle brackets 18 and 20 respectively. The upper ends of the shock absorbers 42 and 44 are secured to chassis support structure such as that identified by reference numeral 46 in FIGURE 2.

A pair of single leaf torsion springs 48 and 50 are provided for supporting the chassis on the left and right lower suspension arms 26 and 28. The construction of the torsion springs and their end connections is illustrated in detail in FIGURES 3, 4, 5 and 6. These figures illustrate the right-hand spring, however, the construction of the left spring 48 is identical and will not be described in detail.

Spring 50 is a single leaf spring element having an aperture 52 formed at its outer end. A guide bolt 54 is secured in the aperture 52 by a nut 56. The bolt 54 has a head portion 58 that is encircled by a hat-shaped bushing 60. The hat-shaped bushing 60 is guided in an aperture 62 formed in the suspension arm 28. A reinforcing plate 64 is positioned on the upper surface of the arm 28. The plate 64 has a rippled portion 66 which functions as a seat for a bearing element 68. A retaining member 70 is secured to the arm 28 by a pair of bolts 72. The outer end of the retaining member 70 is provided with a groove to receive a bearing piece 74.

As seen in FIGURE 3, the bearing elements 68 and 74 bear against opposite sides of the leaf spring 50 near its edges. The bearing elements 68 and 74 have flat surfaces which engage the spring 50. The bolt 72 is tightened to draw the bearing 74 into engagement with the spring 50. The spring 50 is preset so that it is loaded in torsion in all wheel positions from full jounce to full rebound. The torsional loading of the spring 50 tends to rotate its attachment to arm 28 in a counterclockwise direction as seen in FIGURE 6. This tendency to twist causes the spring 50 to bear against the bearings 68 and 74.

A pair of opposite extending lateral members 76 and 78 are secured by rivets 80 to the inner or forward end of the spring 50. The lateral member 78 is provided with an off-set portion that engages a rubber pad 82. A bracket 84 is welded to the structure 30 and forms the support for the pad 82. A shim plate 86 may be positioned between the pad 82 and the bracket 84. Both the bracket 84 and shim 86 have pilot holes to receive a metal insert 88 that is molded into the rubber 82.

Lateral member 76 is also provided with an off-set portion and it rests against a rubber pad 90 which, in turn, is seated on a bracket 92 that is welded to the frame member 30. The pad 90 has a pilot member 94 that is molded into the rubber and is located in an aperture formed in the bracket 92.

As previously stated, the spring 50 is preloaded in torsion to support the chassis 12 on the suspension arm 28, axle housing 10 and wheel 14. The torque reaction tends to rotate the inner end of spring 50 in a counterclockwise direction as seen in FIGURE 4. This loads the rubber pads 82 and 90 in compression. The spring 50 is loaded in torsion from full jounce to full rebound and this loading causes the lateral arms 76 and 78 to remain located against the rubber pads 90 and 82.

The spring 48 for the right-hand side is secured in a similar fashion. As seen in FIGURE 2, spring 48 is secured to the arm 26 by a retainer 96 that is held in place by a bolt 98. Bearing elements 100 and 102 are situated near the edges of the spring 48. The inner end of the spring 48 is provided with lateral arms 104 and 106 that engage brackets 108 and 110 with rubber spring seats (not shown). When the wheels 14 and axle housing 10 traverse a jounce and rebound path, suspension arms 26 and 28 pivot about the bushings 33 and 35 which connect them to the brackets 32 and 34. The leaf springs 48 and 50 will also pivot about an axis passing through the rubber pads which support the lateral arms 104, 106 and 76, 78 on the chassis 12. Because the pivot axes at the inner ends of the springs 48 and 50 do not coincide with the pivot axes of the bushings 33 and 35, a twisting will be imparted to the springs 48 and 50. The springs 48 and 50 are formed of leaf spring material and the tendency to twist will be resiliently resisted whereby the chassis 12 will be resiliently supported on the arms 28 and 26.

The springs 48 and 50 are initially installed in the vehicle with a preload so that the vehicle will be supported at a desired height. This height can be adjusted by adding or removing shims, such as shim 86 of FIGURE 4. By introducing shims, the amount of preload in the springs is increased and this increases the ride height of a chassis 10 with respect to the ground.

There is a limited amount of flexibility built into the suspension system so that the suspension exhibits lateral compliance. As stated previously, the suspension arms 26, 28 and 36 are connected to axle housing brackets and chassis supports by resilient bushings. The leaf springs 48 and 50 have rubber members at their inner ends and single guide bolts 54 and 101 at their outer ends. This construction permits slight lateral displacement between axle housing 10 and the chassis 12.

Assuming that the vehicle of FIGURE 1 is executing a left-hand turn, the chassis 12 will tend to shift to the right under influence of centrifugal force. This lateral displacement of the chassis relative to the axle housing 10 will cause the left arm 26 to assume a more longitudinal direction with respect to the longitudinal axis of the vehicle. In the same regard, right arm 28 will assume a greater angle to the longitudinal axis. This movement of the arms 26 and 28 will cause the left end of axle housing 10 and the left wheel to move slightly rearwardly and the right end and wheel to move slightly forwardly. This movement or canting of the axle will tend to steer the vehicle out of the curve. This is known in the art as understeer. Because the steering of the axle is responsive to a side force, it is known as side thrust understeer. This is a highly desirable feature because it increases vehicle stability and controllability during cornering.

In summary, the concept of the present invention when embodied in a rear suspension system such as illustrated in the drawings provides a simplified construction for supporting a chassis on an axle. Due to its simplicity, considerable economy of manufacture is possible. In addition, the suspension has many other desirable features. One of these is side thrust understeer.

The foregoing description presents the presently preferred embodiment of this invention. Modifications and alterations may occur to those skilled in the art that will come within the scope and spirit of the following claims.

We claim:
1. A vehicle suspension system having a chassis member,
a wheel support member,
a road wheel rotatably mounted on said support member,
a suspension arm pivotally connected to said chassis member and to said wheel support member,
a suspension spring interposed between said chassis member and said suspension arm and constructed to resiliently resist vertical jounce movement of said arm with respect to said chassis member,
said spring being formed of flat leaf spring material,
first means providing a pivotal connection between said arm and one end of said spring,
said pivotal connection of said first means having a vertical pivot axis,
second means constructed to support said spring on said chassis member for pivotal movement about an axis transverse to said other end of said spring,
said just mentioned axis being angularly related to the axis of the pivotal connection between said arm and said chassis member when seen in top plan view.

2. A vehicle suspension system according to claim 1 and including:
said second means comprising resilient means interposed between said spring and said chassis member.

3. A vehicle suspension system according to claim 1 and including:
bearing means interposed between said suspension arm and said spring.

4. A vehicle suspension system having a chassis member,
a wheel support member,
a road wheel rotatably mounted on said support member,
a suspension arm pivotally connected to said chassis member and to said wheel support member,
a suspension spring means interposed between said chassis member and said suspension arm and constructed to resiliently resist vertical jounce movement of said arm with respect to said chassis member,
said spring being formed of flat leaf spring material,
first means providing a connection between said arm and one end of said spring,
attaching members secured to and extending from the outer end of said spring in a direction transverse to its length,
said attaching members extending in a direction angularly related to the axis of the pivotal connection between said arm and said chassis member when seen in the top plan view,
second means interposed between said attaching members and said chassis member and constructed to support said spring for pivotal movement about an axis transverse to said other end of said leaf spring.

5. A vehicle suspension system according to claim 4 and including:
said second means comprising resilient means interposed between said transverse members and said chassis member.

6. A vehicle suspension system according to claim 4 and including:
said resilient means comprising a pair of rubber pads,
one of said pads being disposed above one of said transverse members and beneath a portion of said chassis member,
the other of said pads being disposed beneath the other of said transverse members and above another portion of said chassis member,
said spring being loaded in torsion so that said transverse members exert a compressive force on both of said pads.

7. A vehicle suspension system having a chassis member,
an axle housing,
a pair of road wheels supported at the outer ends of said axle housing,
left and right suspension arms each connected to said chassis member and to said axle housing,
left and right suspension springs interposed between said chassis member and said suspension arms and constructed to resiliently resist vertical jounce movement of said arms with respect to said chassis member, each of said springs being formed of flat leaf spring material, first means providing a connection between one of the ends of said arms and said springs, second means interposed between the other of the ends of each of said leaf springs and said chassis member and constructed to support said springs for pivotal movement.

8. A vehicle suspension system according to claim 7 and including:

said first means providing a pivotal connection between said arms and said springs having a vertical pivot axis, bearing means interposed between said arms and said springs.

9. A vehicle suspension system according to claim 7 and including:

transverse members extending from said other ends of said leaf springs, said second means including resilient means interposed between said transverse members and said chassis member.

10. A vehicle suspension system according to claim 7 and including:

said first means providing a pivotal connection between said arms and said springs having a vertical pivot axis, bearing means interposed between said arms and said springs, transverse members extending from said other ends of said leaf springs, said second means including resilient means interposed between said transverse members and said chassis member.

11. A vehicle suspension system according to claim 7 and including:

said first means providing a pivotal connection between said arms and said springs having a vertical pivot axis, bearing means interposed between said arms and said springs, transverse members extending from said other ends of said leaf springs, said second means including resilient means interposed between said transverse members and said chassis member, said left and right suspension arms being angled forwardly and outwardly whereby lateral movement of said chassis with respect to said axle housing will cant said axle housing in the direction of understeer.

References Cited

UNITED STATES PATENTS

| | | | |
|---|---|---|---|
| 3,123,348 | 3/1964 | Hildebrandt | 280—124.1 |
| 3,229,783 | 1/1966 | Muller | 280—124.1 |

PHILIP GOODMA, Primary Examiner.